Patented Oct. 21, 1941

2,259,875

UNITED STATES PATENT OFFICE 2,259,875

METHOD OF TREATING OIL AND GAS WELLS

Franklin A. Bent and Albert G. Loomis, Berkeley, Calif., assignors to Shell Development Company, San Francisco, Calif., a corporation of Delaware No Drawing. Original application September 9, 1936, Serial No. 99,943. Divided and this application March 25, 1940, Serial No. 325,833

8 Claims. (Cl. 252—8.5)

This invention pertains to the treatment of oil and gas wells, and is more specifically concerned with a method of solidifying unstable formations and selectively sealing off water and gas formations traversed by wells.

This application is a division of our copending application Serial No. 99,943, filed September 9, 1936.

Besides oil-bearing formations, wells usually pass through a variety of formations, such as layers of loose or unstable ground, water-bearing layers, and gas-bearing layers.

It is of great importance to seal off or solidify unstable formations, such, for example, as heaving shale, since they cause considerable trouble by caving in, both during drilling, when they "freeze" the drilling tools, and during production, when they clog the perforated liners and screens, and reduce the fluid flow from the well.

Water layers must be sealed off, as required by law, to prevent the penetration of water into the oil-bearing formations. Production of water with oil from wells is, moreover, highly undesirable since it causes emulsions and corrosion of the equipment.

Gas layers must be sealed off because an excessive production of gas is often wasteful and leads to a rapid lowering of the reservoir potential. Furthermore, unless the water and gas layers are sealed off before a well is subjected to an acidizing treatment, the effect of the acid will be greatest on the water layers, because of the miscibility of acid with water, and on the gas layers, because of their porosity, to the detriment of the oil layers. As a result of the treatment, the undesirable flow of water or gas will therefore be increased much more than the desired flow of oil.

Many methods have been proposed for sealing off undesirable formations. Water and gas layers in top or bottom zones, that is, above or below the oil-bearing strata can be sealed off by cementing or by using formation packers. However, water and gas layers in intermediate zones, that is, in zones lying between two or more oil-bearing strata, cannot be sealed off by these methods without shutting off at least one oil-producing formation.

It is the object of this invention to provide a chemical method of treatment for stiffening and solidifying unstable, loose, heaving or caving formations traversed by a borehole.

It is also the object of this invention to provide a method for selectively sealing off water and gas formations without interfering with the inflow of oil into the well.

It is also an object of this invention to provide a method whereby a mud sheath having good plastering and deplastering properties may be formed within a borehole during the drilling thereof.

The method of the present invention consists of introducing into wells certain organic compounds of silicon, capable of reacting with water to form an insoluble sheath or plug on the walls of the borehole or within the adjacent formations.

For example, organic compounds of silicon can be used to deposit silica and/or more complex silicon compounds, such deposition being effected by hydrolysis and/or condensation of the silicon compounds. The products of hydrolysis or condensation of organic silicon compounds are neutral in character, have no detrimental corrosive effect on the drilling equipment, and do not attack chemically the minerals constituting the strata. Limestone strata, in particular, are left unchanged. In these respects, the organic compounds of silicon are greatly superior to its inorganic compounds, such as the halides of silicon. The latter compounds form hydrochloric acid on hydrolysis and this acid may cause corrosion of the equipment in the borehole, and also will tend to increase the permeability of the water-bearing formations, particularly when such formations are limestone or contain calcium carbonate. Another advantage of the organic compounds of silicon is that they are stable and non-volatile, and their use does not offer the hazard of silicosis which is incurred when using the halogen compound of silicon.

The organic compounds of silicon which can be used to carry out the process of this invention may be generally defined as hydrolyzable derivatives of silicane ($SiH_4$), in which at least one of the hydrogen atoms attached to the silicon atom has been substituted by an alkyl or aryl radical, attached to the silicon atom through an oxygen atom. The hydrogen atoms of silicane which have not thus been replaced by oxy-alkyl or oxy-aryl radicals, may further be substituted by radicals selected from the group consisting of alkyls, aryls, O, OH, $NH_2$, Cl, $NO_2$, SH, and $SO_2$.

The organic compounds of silicon defined above can therefore be represented by the following formula:

(1) $\quad Si(OR)_x X_{4-x}$ wherein R is any alkyl or aryl radical, X is a hydrogen atom equivalent, that is, a hydrogen atom or a hydrogen atom substituted by one of the groups listed above, and $n$ has a value from 1 to 4 inclusive.

Organic di-silicon compounds, which may be substituted in the same way as above, may be equally well used for the purposes of this invention. They may be represented by the following formulae:

(2) $(OR)_3Si—Si(OR')_3$ or $R_3Si—Si(OR')_3$ wherein R and R' may be identical or different alkyl or aryl radicals.

It has been found that very good results are obtained by carrying out the process of this invention with silicon esters, since these compounds hydrolyze readily and their rate of hydrolysis can be accurately controlled. The same is true of condensation products obtained, for example, by combining 2 mols of a silicon ester or esters with 1 mol of water, and eliminating 2 mols of alcohol. These condensation products may be represented by the formulae:

(3) $(RO)_3Si—O—Si(OR')_3$
or $R_3Si—O—Si(OR')_3$

The condensation of the silicon esters may be also carried out by combining 2 or more mols of an organic ester or esters with elimination of water. The condensation products thus obtained may be represented by the following formulae:

(4)
$R_{2n+2}Si_nO_{3n+1}$ (ortho)
$R_{2n}Si_nO_{3n}$ (meta)
$R_{2n-2}Si_nO_{3n-1}$ (deutero)
$R_{2n-4}Si_nO_{3n-2}$ (tritero)
$R_{2n-6}Si_nO_{3n-3}$ (tetrero)
$R_{2n-8}Si_nO_{3n-4}$ (pentero)

The following specific examples of the organic silicon compounds defined above and suitable for the purposes of this invention may be given:

(1) ethyl ester of tri-methyl silicon,
$(CH_3)_3Si(OC_2H_5)$
di-ethyl ester of di-ethyl silicon,
$(C_2H_5)_2Si(OC_2H_5)_2$
tetra ethyl silicate, $Si(OC_2H_5)_4$
tetra phenyl silicate, $Si(OC_6H_5)_4$
di-ethyl ester of di-phenyl silicon,
$(C_6H_5)_2Si(OC_2H_5)_2$
di-ethyl silicon oxide, $(C_2H_5)_2SiO$
tri-ethyl silicol, $(C_2H_5)_3SiOH$
di-phenyl silicol, $(C_6H_5)_2Si(OH)_2$
silico-propionic acid, $(C_2H_5)SiO(OH)$
silico-benzoic acid, $(C_6H_5)SiO(OH)$
tri-ethyl chloride of silicic acid, $SiCl(OC_2H_5)_3$
tri-ethyl amide of silicic acid,
$Si(NH_2)(OC_2H_5)_3$
tri-methyl amide of silicic acid,
$Si(NH_2)(OCH_3)_3$
tri-ethyl nitrite of silicic acid,
$Si(NO_2)(OC_2H_5)_3$
tetra-β-aminoethyl-orthosilicic acid ester,
$Si(OC_2H_4NH_2)_4$
(2) hexa-methyl ester of di-silicon,
$(CH_3O)_3Si—Si(CH_3O)_3$
tri-methyl-tri-phenyl ester of di-silicon,
$(CH_3O)_3Si—Si(C_6H_5O)_3$
(3) tri-methyl-tri-phenyl disilicate,
$(CH_3O)_3Si—O—Si(OC_6H_5)_3$
hexa-ethyl disilicate.
$(C_2H_5O)_3Si—O—Si(OC_2H_5)_3$
(4) methyl-ortho-tri-silicate $(CH_3)_8Si_3O_{10}$
ethyl-meta-tetra-silicate $(C_2H_5)_8Si_4O_{12}$
methyl-tetrero-penta-silicate $(CH_3)_4Si_5O_{12}$ In treating a well with any of the above substances, the latter may in many cases be used directly, without dilution or without being dissolved in a solvent. This is especially true when silicon esters are used. However, to facilitate the handling of the treating agents and to secure a gradual action which may be subject to control, it is sometimes preferable to dissolve or disperse the above compounds in a non-aqueous organic solvent such as mineral oils, gasoline naphtha, benzol, alcohols, esters, ketones, and ethers.

The method of introducing these materials into the wells depends upon the particular conditions encountered and the particular objective sought.

If the process of this invention is applied during the drilling of a well for the purpose of solidifying unstable formations and forming a mud sheath of particular strength on the walls of the borehole to prevent the escape of gases, the infiltration of water into the well or a loss of the circulation fluid into porous formations, a non-aqueous solvent consisting of or comprising any desired organic silicon compound may be used to form the drilling fluid in combination with materials such as clay, shale, limestone, and/or, if desired, suitably ground weighting materials such as barytes, galena, iron or lead oxides, etc. The use of such non-aqueous mud fluids is especially effective in preventing difficulties with heaving and caving formations. It has been found that these non-aqueous suspensions of clay and/or other solid substances may be peptized or deflocculated, and their viscosity kept at a desirably low value, through the use of suitable stabilizing agents. The best results are usually obtained with stabilizers having a molecular weight not greatly exceeding that of the suspension medium. The following stabilizers may be advantageously used: fatty acids, such as oleic, stearic, palmitic, naphthenic, etc.; oil-soluble soaps prepared from these fatty acids, for example, calcium, magnesium or aluminum oleates, stearates, palmitates, naphthenates; amines, for example, primary, secondary and tertiary alkylamines such as cetylamine, di-octylamine, tri-hexylamine, etc.; alkylolamines such as tri-amylolamines, etc.; primary, secondary and tertiary arylamines, such as aniline, xylidine, ethyl-aniline, diethyl-aniline, etc.; heterocyclic nitrogen bases, such as indole, pyridine, picoline, lutidine, quinoline, etc. Any mixtures of the above compounds may equally well be used: for example, a mixture of oleic acid with an equivalent amount of an amine of approximately the same molecular weight has been found very effective.

The following examples of typical drilling muds prepared according to the above method may be given:

(1) 25 parts of clay are dispersed in 74 parts of a 5% solution of a silicon ester dissolved in alcohol, to which 1 part of pyridine is added, giving a mud fluid of satisfactory viscosity and stability.

(2) 25 parts of clay are dispersed in 73 parts of a 5% solution of a silicon ester dissolved in alcohol, to which 2 parts of sodium stearate soap are added, giving a dispersion satisfactory for drilling purposes and weighing about 10 lbs. per gallon.

Since water or at least small amounts of moisture are found in all strata ordinarily penetrated by a well, a firming, solidifying and cementing chemical, such as silicic acid, will be formed by hydrolysis in the interstices of the formation adjacent the well bore continuously as the bore is sunk, water horizons being plugged at the same time, and gas formations being sealed off by the impervious mud sheath formed on the walls of the borehole and supported by the hydrostatic effect of the mud fluid column. Since, therefore, it is not necessary to use any casing or liner until the oil horizon is reached, considerable saving in the cost of drilling wells is effected by the application of the present method.

If a treatment according to this invention is applied to a producing well having the usual casing and tubing, the following procedure may be followed if it is desired to seal off a water formation.

The well is preferably first filled with oil, and a desired amount of a non-aqueous solution consisting of or comprising an organic silicon compound is then introduced into the well through the tubing, and is forced into the water and oil horizons by pumping another charge of oil down the tubing or by applying pressure to the well in any other manner. The solution will diffuse into the formation water, giving by hydrolysis the desired water and acid-insoluble precipitate of silica. When the flow of the well is reversed by pumping or swabbing, that part of the solution which entered the oil horizon is flushed out unchanged, no hydrolysis taking place in the absence of water, while the water horizon is effectively plugged. If desired, the well may now be subjected to acid treatment. The acid will not be able to enter the water horizon, and its effect will be confined to the oil horizon.

In using the method of this invention to seal off gas-bearing layers or for consolidating heaving or unstable formations, the same procedure as for water layers may be followed. If the gas-bearing or unstable formations are sufficiently wet, as is often the case, the procedure is similar to that described above. If the formations are dry, or substantially dry, an aqueous liquid such as water or brine, may be introduced into the well and forced into the formations before or after the injection of the treating solution. Hydrolysis of the silicon compound in the pores of the formations then takes places as described above. In order to insure the formation of the insoluble precipitate as far back within the formation as possible, it may sometimes be desirable to introduce into the well and force into the formation a charge of a neutral material, such as oil, between the charges of the treating solution and the aqueous liquid.

In treating gas-bearing formations adjacent to oil-bearing formations, and especially in cases where the present process is to be followed by an acidizing treatment, a somewhat different procedure may be followed. The tubing and the casing are first filled with oil. Some plugging material, such as calcium or iron carbonate slurry, calcium carbonate mud, etc., is now pumped down the tubing to shut off the oil formation, this plugging material being soluble in acid. The oil formation is thus sealed off by a temporary plug or sheath, care being taken not to allow the plugging material to reach and seal the gas formation. The well is then treated to seal off the gas formation according to the process of the present invention, that is, by forcing a charge comprising an organic silicon compound followed by a charge of an aqueous liquid into the gas-bearing formation. These charges, however, enter only the gas formation, being prevented from penetrating into the oil formation by the impervious plug or sheath formed by the previous treatment with acid-soluble plugging materials, so that only the gas-bearing formation is sealed off by the hydrolysis products of the organic silicon compounds formed within said formation. The temporary plug or sheath sealing off the oil-bearing formation may subsequently be easily removed by acid treatment or simply by reversing the flow of the well (a pressure differential of from five to ten pounds being usually sufficient to remove such sheaths) while the gas formation remains sealed off by the acid-insoluble compounds of silicon formed therein. This chemical seal in the gas formation may subsequently be removed to any desired degree, by dissolving it with caustic alkali or any other suitable agent while the silicic acid is still in the gel or hydrated form.

In treating oil wells by any of the methods described above, it is highly desirable to control accurately the rate of hydrolysis of the organic silicon compounds used, since a delayed hydrolysis will result in the precipitation of silica well back in the formation and secure the optimum sealing effect. The rate of hydrolysis may be effectively controlled in the present process in several ways:

(1) By controlling the hydrogen ion concentration (pH) of the treating solution. This may be done either by using small amounts of a catalyst of an acid or basic type, or by changing the constitution of the organic silicon compounds, namely, by using organic compounds substituted with such groups as, for example, Cl, $NO_2$, $SO_2$, $NH_2$, etc. The presence of these groups in the silicon compounds molecules results, upon hydrolysis, in the formation, in addition to silica, of acidic or basic materials such as nitric acid, sulfuric acid, hydrochloric acid, hydroxyamines, etc., which are formed in amounts sufficiently small to avoid an attack on the formation, but effective in keeping the pH of the solution at a desired value.

(2) By selecting in each particular case a silicon compound with a suitable organic group (R) in its molecule, since compounds with organic groups of higher molecular weight hydrolyze more slowly.

(3) In cases where the silicon compounds are used for treating wells in a non-aqueous solution, by controlling their concentration in the solvent. For example, the following results were obtained in a series of tests made with varying amounts of the different reagents:

| | Silicon ester | Ethyl alcohol | $NH_4OH$ | Water | |
|---|---|---|---|---|---|
| | Mols | C. c. | Drops | Mols | |
| 1 | 2 | 5 | 1 | 1 | Heavy precipitate resulting from hydrolysis. |
| 2 | 1 | 5 | 1 | 1 | Precipitate less heavy than in 1. |
| 3 | 1 | 5 | 1 | 2 | Much smaller precipitate forming more slowly than in 1. |
| 4 | 1 | 21 | 1 | 1 | Precipitate formed only after several hours. |

The organic silicon compounds used for the present process may be prepared by methods well known to the art. Reference is made in this regard to the following publications:

Ann. 474, 276, 1929
Ann. 57, 331, 1846
Mellor—Comprehensive Treatise, the article beginning on page 969, vol. 6.

Although the process of this invention has been described with regard to its uses in well drilling practice, it is obvious that it can equally well be applied for sealing off, rendering impervious to fluids, or solidifying ground strata which do not lie in the proximity of wells. Thus, the present invention has many practical applications, for example, in building canals, sluices or dykes in porous soil, where it is desirable to stop the percolation of water through the sand, or in constructing bridge pillars, landing piers, tunnels, etc., in ground formations which are not sufficiently firm or impervious.

We claim as our invention:

1. In a process for sealing off formations traversed by a well, drilling said well with an inert non-aqueous drilling fluid comprising dispersed clay and a solution of an ester of silicon in alcohol.

2. In a process for sealing off formations traversed by a well, using a drilling fluid comprising clay dispersed in an inert non-aqueous liquid and a solution of an ester of silicon in an alcohol whereby a mud sheath is formed on the walls of the borehole during drilling, and the strength and fluid-imperviousness of said sheath is improved by the hydrolysis products of the ester of silicon formed upon contact with the water present in the formation.

3. In a process for sealing off formations traversed by a well, drilling said well with a non-aqueous drilling fluid comprising dispersed clay and an ester of silicon dissolved in said fluid, said fluid being incapable of hydrolyzing said ester of silicon.

4. A water-free drilling fluid comprising a non-aqueous suspending liquid, a solid suspended material, and an ester of silicon, said liquid being incapable of hydrolyzing said ester of silicon.

5. A water-free drilling fluid comprising a non-aqueous suspending liquid, clay, and an ester of silicon, said liquid being incapable of hydrolyzing said ester of silicon.

6. In a process for sealing off formations traversed by a well, drilling said well with a drilling fluid having a non-aqueous liquid component incapable of hydrolyzing esters of silicon, said drilling fluid having an ester of silicon added thereto.

7. In a process for sealing off formations traversed by a well, drilling said well with a drilling fluid having mineral oil as the liquid component, said drilling fluid having an ester of silicon added thereto.

8. In a process for sealing off formations traversed by a well, drilling said well with a drilling fluid having a non-aqueous liquid component incapable of hydrolyzing esters of silicon, said drilling fluid having an ester of silicon and a peptizing agent added thereto.

FRANKLIN A. BENT.
ALBERT G. LOOMIS.